(No Model.) 2 Sheets—Sheet 1.

E. G. DORCHESTER.
BICYCLE TIRE.

No. 477,048. Patented June 14, 1892.

WITNESSES:
J. J. Laass.
H. M. Seamans.

INVENTOR:
Edward G. Dorchester
By Hull, Laass & Hull
his ATTORNEYS.

(No Model.) 2 Sheets—Sheet 2.

E. G. DORCHESTER.
BICYCLE TIRE.

No. 477,048. Patented June 14, 1892.

WITNESSES:
J. J. Laass
H. M. Seamans

INVENTOR:
Edward G. Dorchester
By Duell, Laass & Duell
his ATTORNEYS.

UNITED STATES PATENT OFFICE.

EDWARD G. DORCHESTER, OF GENEVA, NEW YORK.

BICYCLE-TIRE.

SPECIFICATION forming part of Letters Patent No. 477,048, dated June 14, 1892.

Application filed January 25, 1892. Serial No. 419,112. (No model.)

*To all whom it may concern:*

Be it known that I, EDWARD G. DORCHESTER, of Geneva, in the county of Ontario, in the State of New York, have invented new and useful Improvements in Bicycle-Tires, of which the following, taken in connection with the accompanying drawings, is a full, clear, and exact description.

This invention consists, first, in a novel construction of the rubber air-tube, which is inclosed and compressed circumferentially in a non-extensible covering, said compression thickening the rubber and rendering it self-closing in case of puncture and also stronger and more durable, the cracking of the tube on the inside being most effectually prevented; secondly, in a novel construction of the felly or rim, having at opposite edges circumferential flanges with intermediate webs, which effectually stiffen said rim, and, thirdly, in a novel attachment of the jacket to the rim, all as hereinafter more fully described, and specifically set forth in the claims.

The invention is fully illustrated in the annexed drawings, in which—

Figure 1:
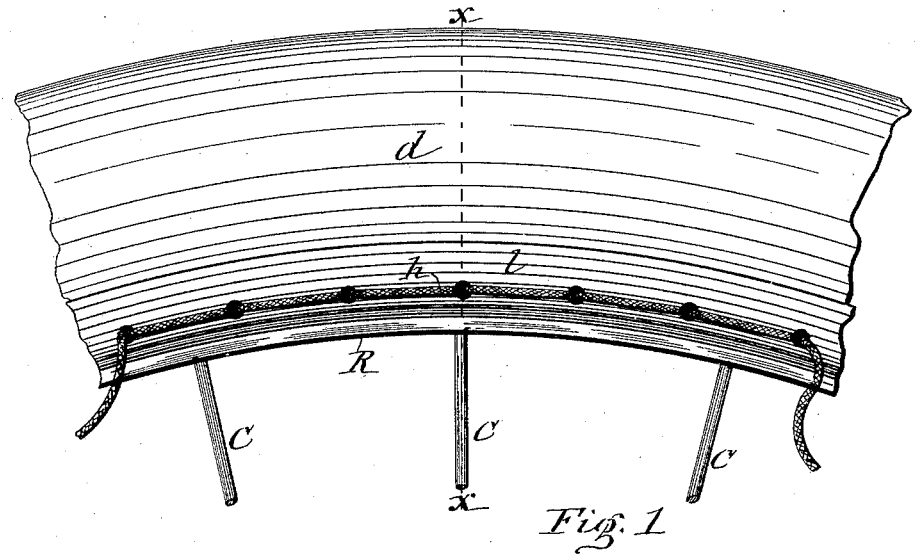
Figure 2:
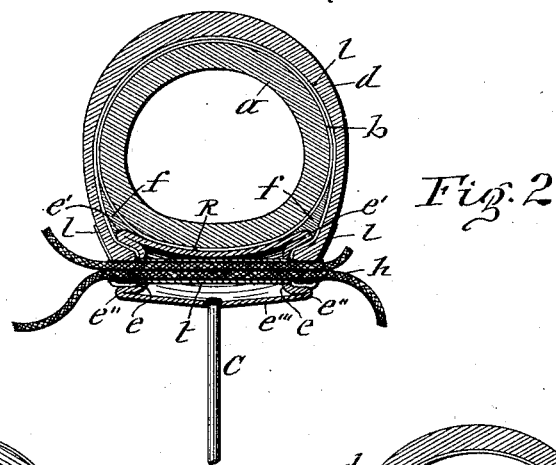
Figure 3:
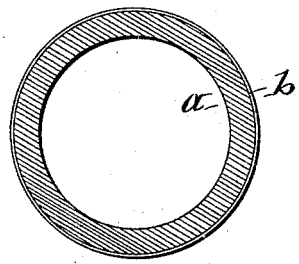
Figure 4:
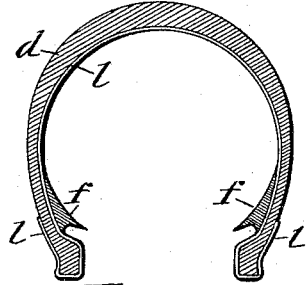
Figure 5:
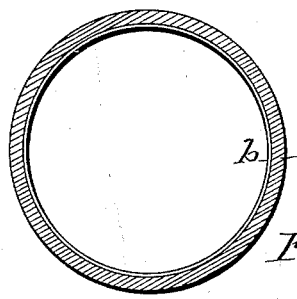
Figure 7:
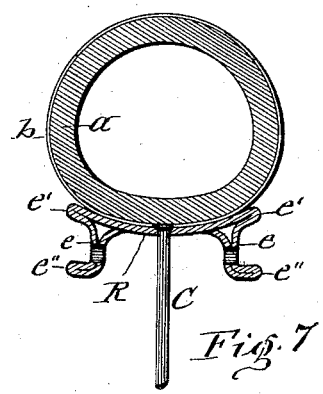
Figure 6:
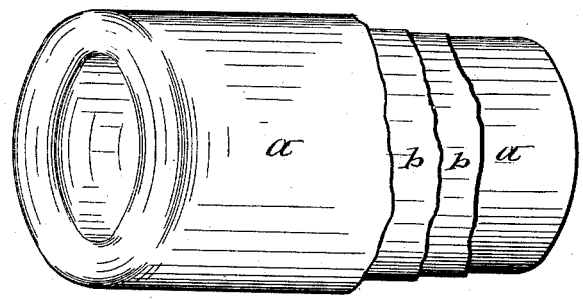
Figure 8:
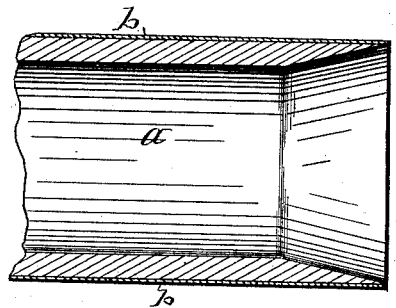

Figure 1 is a side view of a section of a bicycle-tire embodying my invention. Fig. 2 is a transverse section on line $xx$ in Fig. 1. Figs. 3 and 4 are detached transverse sections of the rubber tube and the jacket, respectively. Fig. 5 is a transverse section of the rubber tube in its original condition. Fig. 6 is a perspective view illustrating the method of circumferentially compressing the rubber tube in the non-extensible lining. Fig. 7 is a transverse section of a modification of the construction of the wheel-rim, and Fig. 8 illustrates the method of uniting the ends of the tube.

Similar letters of reference indicate corresponding parts.

$a$ represents the rubber tube which constitutes the elastic tire proper. This tube I compress circumferentially in a canvas or other analogous non-extensible covering or tube $b$, and thus thicken and strengthen the rubber, as before stated. To accomplish this, I employ a non-extensible tube of the same diameter externally as that required of the completed tire. This tube I cover with a coating of rubber to form a rubber tube over the non-extensible tube and vulcanize it thereto. I then turn the combined tubes inside out, and thus compress the rubber tube within the non-extensible tube $b$. To unite the ends of said tube, I bevel the two end edges reverse from each other, as shown in Fig. 8 of the drawings, and lap them onto each other and cement them together. The canvas lining $b$ is made of sufficient length to extend over the splice of the rubber tube and is cemented thereto.

R represents the rim or felly of the wheel, which rim I form of a band of sheet metal, the opposite edges of which I form with fluted webs $e\ e$, preferably by bending the edges of the band into the double-folded outwardly-projecting flanges $e'\ e''$, with the webs $e\ e$ between them. To brace these webs, I either continue said edges with outward folds contiguous to the inner sides of the webs and then bending them inward and bringing them to bear on the inner side of the body of the band, as shown in Fig. 7 of the drawings, or by extending the band from one of the inner flanges $e''$ directly across to the other of said flanges, and thus form a cross-tie $e'''$, as shown in Fig. 2 of the drawings, to which cross-tie the spokes C are attached.

$d$ denotes the jacket or outside covering, which is formed of rubber, with a canvas lining $l$ interposed and cemented to said parts. The longitudinal edges of said jacket are reinforced in thickness, and the canvas lining $l$ extends around said edges, so as to envelop and protect the same. These enveloped edges are provided with eyelets and are drawn into the flutes of the webs $e\ e$, which are perforated corresponding to the eyelets, and by means of lacings $h$, of cord or wire, passing through the eyelets and perforations of the webs the jacket is firmly secured to the tire. When the rim R is constructed with the cross-tie $e''$, I extend tubular guides $t$ across the rim and fasten them in the perforations thereof. In applying the lacings $h$ they are passed through the tubular guides. To guard against cutting or chafing of the tube $a$ by the edges of the rim R, I interpose between the tube $a$ and said jacket the cushions $ff$ over the edges of the rim and vulcanize them to the inside lining $l$.

Having described my invention, what I claim as new, and desire to secure by Letters Patent, is—

1. A pneumatic tire formed of a rubber tube terminating with reversely-beveled end edges lapping onto each other and connected together and a canvas lining covering said tube and extending over the splice thereof and cemented thereto, as set forth.

2. The rim R, formed with perforated webs projecting inward therefrom, in combination with the rubber tube and the jacket covering said tube and having its longitudinal marginal portions reinforced in thickness and seated on the exterior of said webs, and lacings passing through the webs and fastening thereto the aforesaid marginal portions of the jacket, as set forth.

3. The rim R, formed with the perforated and fluted webs $e\ e$, in combination with the rubber tube $a$, the jacket $d$, having its longitudinal marginal portion seated in the flutings of the webs, lacings passing through the webs and fastening thereto the jacket, and the cushions $f f$, interposed between the jacket and air-tube at the outer edges of the rim, substantially as described and shown.

4. The rim R, formed with the perforated fluted webs $e\ e$, projecting inward from said rim, in combination with the rubber tube $a$, the jacket $d$, having its longitudinal edges reinforced in thickness, the canvas lining $l$, wrapped around and inclosing said edges of the jacket and seated with the same on the exterior of the aforesaid webs, eyelets secured in the jacket and its inclosing lining, and lacings passing through said eyelets and perforations of the webs $e\ e$, substantially as described and shown.

5. The rim R, composed of a sheet-metal band bent at opposite edges into the double flanges $e'$ and $e''$, and intervening webs $e\ e$, projecting inward from the rim, in combination with the rubber tube $a$ and the jacket $d$, enveloping said tube and secured to the exteriors of the aforesaid webs of the rim, substantially as described and shown.

6. The rim R, composed of a sheet-metal band bent at opposite edges into the double-folded flanges $e'\ e''$, intervening webs $e\ e$, projecting inward from the rim, and cross-tie $e'''$, uniting the inner flanges $e''$ and perforated in said webs, in combination with the rubber tube $a$, jacket $d$, having its longitudinal edges reinforced in thickness and seated on the exteriors of the aforesaid webs, and lacings passing through the webs and edges of the jacket, substantially as described and shown.

In testimony whereof I have hereunto signed my name this 22d day of January, 1892.

EDWARD G. DORCHESTER. [L. S.]

Witnesses:
S. SOUTHWORTH,
JNO. W. MELLEN.